Nov. 8, 1955 — W. CARTWRIGHT ET AL — 2,723,121
ADJUSTABLE SKIPPING ROPE
Filed Sept. 23, 1954

INVENTORS
Wilfred + Margaret Cartwright
Ralph Burch
Attorney

United States Patent Office 2,723,121
Patented Nov. 8, 1955

2,723,121

ADJUSTABLE SKIPPING ROPE

Wilfred Cartwright and Margaret Cartwright, Victoria, British Columbia, Canada

Application September 23, 1954, Serial No. 457,949

6 Claims. (Cl. 272—75)

This invention relates generally to skipping ropes, and in particular to a skipping rope which is adjustable in length through the handles, so that it may be convenient for use by children, or persons of varying ages and sizes, with regard to length and comfort.

It has been known to provide skipping ropes with handles, in which the rope is adjustable as to length in various ways, but as far as we are aware, it has never been known to make use of a hollow handle through which the rope may be drawn to any convenient length, and the excess length wound around the handle as in a bobbin.

An object of this invention is to provide a skipping rope having handles, or grip adjacent each end of said rope, said rope being adjustable in length by being pulled through holes bored lengthwise in said grips, the excess length being wound around the outside of the grips.

Another object of this invention is the provision of an adjustable skipping rope having one or more swivel connections inserted in the length of rope to avoid kinking therein.

A further object of the invention is the provision of a skipping rope having a plurality of short flexible cylinders fitting loosely over the rope in a rotatable manner to protect the rope from undue wear where it comes in contact with the ground, and having an added advantage of extra weight to keep the rope taut, and giving it momentum.

The foregoing and other objects and advantages of the invention will appear more fully hereinafter from a consideration of the detailed description which follows, taken together with the accompanying drawings as illustrated by way of example, in which.

Similar reference numerals designate corresponding parts in both figures of the drawings.

Figures 1, 2:
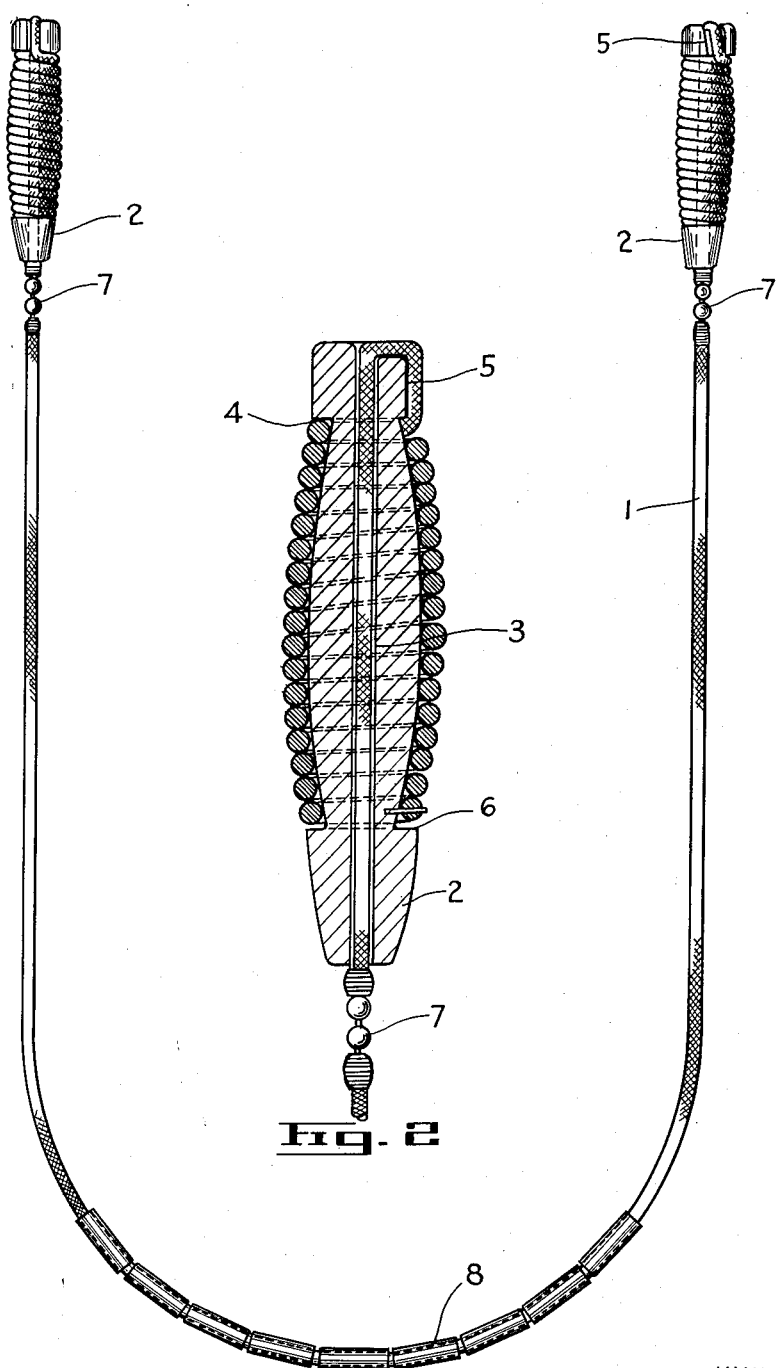
Figure 1 is an elevational view of the skipping rope assembly.
Figure 2 is a sectional view of a grip showing the manner in which the skipping rope is adjustably inserted therein.

Referring now to the drawings, a skipping rope 1, is detachably, and adjustably connected to a pair of handles, or grips 2, adjacent the terminals of said rope. As both grips are identical one only will be described. The grip 2, is shaped so that it may be conveniently grasped by the hand, and a hole 3, is bored through the centre of the grip longitudinally substantially the same diameter as the rope, and through which the rope is adapted to be pulled. The grip is provided with a shoulder 4, adjacent its upper extremity, and a groove 5, is formed on one side thereof for a purpose to be described later. A shoulder 6, is also formed adjacent the lower extremity of said grip.

In order to prevent kinking in the rope when skipping, one or more swivel connections 7, are inserted in the length of rope, at any convenient point, but shown by way of example in the drawing, close to the handles. A series of loosely fitting flexible collars, or cylinders 8, are threaded on the rope to protect it from wear, where it comes in contact with the ground, these collars may be readily replaced when worn, and have the added advantage of weighting the rope centrally of its length.

To assemble the skipping rope for operation the collars 8, are first threaded on to the rope 1, then each terminal of the said rope is threaded through the hole 3 of a handle, or grip, and pinned thereto in close proximity to the shoulder 6, by any convenient means, such as a tack, or staple. The rope is then adjusted to the desired length by being wound, or unwound around the grip between the shoulders 4 and 6, as in a bobbin, the rope passing through the groove 5, preventing it from being unwound when in use.

Without further detailed description it will be seen that we have provided an adjustable skipping rope that may be adjusted to any suitable length for all sizes and ages of persons, that will not become kinked in use, which is readily assembled, and one that may be easily and inexpensively manufactured, and in which the wearing parts may be readily replaced.

It is believed that the construction and advantages of the structure shown may be apparent from the foregoing paragraphs taken in conjunction with the accompanying drawings without further detailed description.

While the preferred embodiment of the invention has been disclosed it is understood that minor changes in the construction, combination and arrangement of cooperating parts may be resorted to within the scope of what is claimed without departing from the spirit of the invention.

We claim:

1. An adjustable skipping rope, comprising a rope, a pair of handles, each of said handles having a hole bored centrally and longitudinally therethrough, through which the terminals of said rope slidably extend, each of said handles being provided with an upper and a lower shoulder, the terminals of said rope being secured to said handles adjacent said lower shoulders, and coiled around said handles between said shoulders to adjust the length thereof, each of said upper shoulders being provided with a groove through which said rope passes to prevent accidental unwinding thereof.

2. An adjustable skipping rope, as set forth in claim 1, in which a series of loosely fitting collars are slidably threaded on said rope to protect it from wear, where said rope comes in contact with the ground, said collars also acting as an added weight to keep said rope taut, and to give it momentum.

3. A skipping rope, as claimed in claim 1, in which at least one swivel connection is provided in the length of said rope to prevent kinking thereof.

4. An adjustable skipping rope comprising a length of rope, a pair of tubular handles through which the ends of said rope slidably extend, said handles having their outer surface provided with shoulders adjacent their ends, the ends of said rope being secured to the outer surface of said handles adjacent one of said shoulders and coiled about said handles between the shoulders thereof to adjust the length of said rope.

5. An adjustable skipping rope as described in claim 4 having a series of collars mounted on said rope intermediate said handles.

6. An adjustable skipping rope as described in claim 4 having a swivel connection in the length of said rope.

References Cited in the file of this patent

UNITED STATES PATENTS

| | | |
|---|---|---|
| 623,698 | Beckh | Apr. 25, 1899 |
| 1,666,201 | Goldstein | Apr. 17, 1928 |
| 2,253,075 | Johnson | Aug. 19, 1941 |

FOREIGN PATENTS

| | | |
|---|---|---|
| 559 | Great Britain | 1902 |